United States Patent
Haak

(10) Patent No.: US 10,003,562 B2
(45) Date of Patent: Jun. 19, 2018

(54) ELECTRONIC MAIL-BASED VEHICLE CREW MESSAGING

(71) Applicant: PANASONIC AVIONICS CORPORATION, Lake Forest, CA (US)

(72) Inventor: James A. Haak, Medina, WA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 252 days.

(21) Appl. No.: 14/856,385

(22) Filed: Sep. 16, 2015

(65) Prior Publication Data

US 2017/0078231 A1   Mar. 16, 2017

(51) Int. Cl.
| | |
|---|---|
| G06F 15/16 | (2006.01) |
| H04L 12/58 | (2006.01) |
| G06Q 10/10 | (2012.01) |
| H04B 7/185 | (2006.01) |
| G06Q 50/00 | (2012.01) |

(52) U.S. Cl.
CPC ........... H04L 51/20 (2013.01); G06Q 10/107 (2013.01); H04B 7/18506 (2013.01); H04B 7/18508 (2013.01); H04L 51/28 (2013.01); G06Q 50/00 (2013.01)

(58) Field of Classification Search
CPC ................ H04B 7/18506; H04B 7/18508
USPC ................ 709/206; 455/431; 701/3
See application file for complete search history.

(56) References Cited

U.S. PATENT DOCUMENTS

| | | | |
|---|---|---|---|
| 6,785,712 B1 * | 8/2004 | Hogan ............... | H04B 7/18506 709/206 |
| 8,984,421 B2 | 3/2015 | Canal et al. | |
| 2002/0160773 A1 * | 10/2002 | Gresham ............ | H04B 7/18506 455/431 |
| 2010/0187354 A1 | 7/2010 | Helfrich | |
| 2011/0004832 A1 | 1/2011 | Canal et al. | |
| 2011/0160937 A1 | 6/2011 | Cailluad et al. | |
| 2012/0191273 A1 * | 7/2012 | Jacobs ............... | H04B 7/18508 701/3 |

OTHER PUBLICATIONS

European Patent Office, Extended European Search Report, 8 pages, dated Dec. 1, 2016, Munich, Germany.
Rockwell Collins, AviNet Mail, ARINC Aviation, 2015, 2 pages, http://www.rockwellcollins.com/Services_and_Support/Information_Management/ARINC_Aviation/AviNet/AviNet_Mail.aspx.

* cited by examiner

Primary Examiner — Kyung H Shin

(74) Attorney, Agent, or Firm — Stetina Brunda Garred & Brucker

(57) ABSTRACT

A system for exchanging messages between crews stationed on a vehicle and staff or $3^{rd}$ parties stationed within at least one or more travel points. A vehicle mail server has a shared e-mail account that is addressable with a unique vehicle attribute and accessible by the vehicle crew. The shared e-mail account is also addressable with a trip identifier alias. A central mail server also has a shared e-mail account that is associated with one of the travel points, and accessible by crew deployed thereto. The shared e-mail account is also addressable with one or more trip identification and status aliases. An association between the trip identifier alias and the vehicle attribute, as well as between the trip identification and status alias and the travel point is dynamically defined on the central mail server.

20 Claims, 6 Drawing Sheets

ELECTRONIC MAIL-BASED VEHICLE CREW MESSAGING

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to communications systems, including those for use by crew members of passenger vehicles. More particularly, the present disclosure relates to electronic mail-based aircraft and ground crew messaging.

2. Related Art

At the individual aircraft level, conducting flight operations requires the coordinated efforts of numerous personnel. These include flight crew, which broadly encompasses those on board during the flight to operate the aircraft, and includes flight deck positions and cabin positions on passenger flights. Additionally, there are ground crews that service and maintain the aircraft in between flights, as well as manage various ground-based operations at airports to ensure the movement of passengers and/or cargo. Airlines that operate a large fleet of aircraft must coordinate numerous flights across multiple departing and destination airports around the globe with the operation center of the airline, with air traffic control, and with national aviation authorities.

One widely deployed data communications system for this purpose is known as ACARS, or Aircraft Communications Addressing and Reporting System. The ACARS infrastructure provides bidirectional air-to-ground digital communications via VHF, HF, and satellite transmissions. Most ACARS messages have a structured format, but it also possible to include a free text field within the ACARS message. This free text field has been used by In-Flight Entertainment (IFE) applications to support cabin crew text messaging with ground personnel.

During the course of a flight, the ground crew and airline operations centers communicate with the flight crew as needed. With a continued reliance on the ACARS infrastructure, messaging applications built into existing cabin in-flight entertainment (IFE) systems could be used to send messages to the ground crew and airline operation centers by accessing the ACARS Management Unit (MU). Bandwidth of ACARS transmissions is limited, and in some MU installations, such access by IFE systems may have been denied in order to conserve available bandwidth. In other MU installations, such access by IFE systems may have been denied to increase the security of the flight deck, by segregating IFE systems from networks shared by the flight deck. In either case, some airlines are no longer able to rely on ACARS as a universal solution across their entire fleet for crew messaging.

There are several shortcomings associated with an ACARS-based crew messaging system. In particular, a flight crew must physically access a fixed terminal at various locations around the aircraft to perform a specific fixed task. The remaining workload must be completed with separate devices, which may not necessarily be proximate to these fixed terminals. Furthermore, information must be transferred manually from the separate devices to the fixed terminals. Finally, an ACARS based crew messaging system does not provide any support for MIME attachments, such as images. These shortcomings, coupled with the uneven deployment of ACARS based messaging solutions across an airline fleet, create operational inefficiencies within the airlines.

Due to these inefficiencies there is a need in the art for an improved crew messaging system that eliminates reliance on the existing ACARS infrastructure. In particular, there is a need for supporting both on-board and ground mobility, capable of handling all types of data files. Therefore, there is a need in the art for an electronic mail-based vehicle crew messaging system as contemplated by the present disclosure.

BRIEF SUMMARY

A vehicle crew messaging system that utilizes electronic mail (e-mail) aliases to address a vehicle using dynamic trip assignments is disclosed. Additionally, the dynamic configuration of an onboard portable electronic device (PED), such as a Tablet or Smartphone, to allow access to the vehicle's email account is also disclosed.

One embodiment of the present disclosure is directed to a system for exchanging messages between crews stationed on a vehicle and staff or $3^{rd}$ parties located in at least one or more travel points. The system may comprise a vehicle mail server computer system that is deployed on each vehicle, and a central mail server computer system that is deployed remotely from the vehicles. The vehicle mail server computer system may include a vehicle shared electronic mail account that is at least partially addressable with a vehicle designator unique to the vehicle and may further be at least partially addressable with various trip identifier aliases for the duration of the trip.

Another embodiment of the disclosure is directed to the flexibility of the messaging system to support many types of existing user devices, including any combination of (1) personal PEDs on aircraft, (2) shared PEDs on aircraft, (3) IFE terminals on aircraft, (4) personal PEDs on ground, (5) shared PEDs on ground, (6) terminal or kiosk on ground. Further, the ground terminals or kiosks currently supporting ACARS on some aircraft may be modified to work with the messaging system, or new ground terminals or kiosks may be deployed to support the messaging system that are wholly separate from those currently dedicated to ACARS support. Further, onboard PEDs that support cabin/IFE management including but not limited to duty free sales, food and drink, comfort services, passenger personalized services, cabin lighting, cabin announcements, and entertainment controls may be modified to support the messaging system or new onboard PEDS may be deployed to support the messaging system.

Another embodiment of the disclosure is directed to flexibility of the messaging system to operate over any combination of satcom systems without modification or support from the satcom provider(s). Further, the messaging system dynamically selects the least cost of many satcom routes during outages of one or more satcom routes. Further, recognizing the inherently higher availability of the multi-satcom channel messaging system in contrast to the typically single satcom channel used to gather ACARS OOOI (Out from gate, Off the ground, On the ground, In to gate), the messaging system itself may be used to transfer OOOI events to ground systems that in turn can be used to update the aliases of the aircraft email address.

Another embodiment of the disclosure is directed to the processes used by the onboard flight crew to manage the shared inbox, including but not limited to manual inbox management and/or rules based inbox management which in turn may include moving and categorizing messages, creating alerts, or playing audible sounds based on keywords, addresses, attachments, or properties. Further, the system supports remote inbox management, for example from a ground based supervisor.

Another embodiment of the present disclosure is directed to a method for transmitting a message to crew members stationed on a vehicle. The method may include receiving the message on a central mail server computer system. The message may have a destination address incorporating a trip identifier alias. There may also be a step of querying one or more databases for a destination vehicle shared mail account identifier, as well as a network address of a vehicle mail server computer system. The query may be based upon the trip identifier alias specified in the received message. The method may then proceed to receiving the destination vehicle shared mail account identifier and the network address of the vehicle mail server computer system on the central mail server computer system. A data communications link may be established to the vehicle mail server computer system with the received network address therefor. The method may also include relaying the message to a destination vehicle mail transport agent over the data communications link for delivery to a mail account that corresponds to the destination vehicle shared mail account identifier. An association between the trip identifier alias, and the destination vehicle shared mail account identifier and the network address of the vehicle mail server computer system, may be updated in response to changes in status of the vehicle as reported therefrom.

Still another embodiment of the disclosure is a method for transmitting a message to crew members stationed at a fixed base travel point. The method may include receiving the message on a central mail server computer system. The message may have a destination address incorporating a trip identification and status alias. There may also be a step of querying one or more databases for a destination base shared mail account identifier from the trip identification and status alias. Additionally, the method may involve associating the message with a mail account corresponding to the destination base shared mail account identifier. An association between the trip identification and status aliases and the destination base shared mail account identifier may be updated in response to changes in status of a vehicle traversing the fixed base travel point as reported from the vehicle.

The various embodiments of the present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure is directed to an electronic mail-based vehicle crew messaging system that allows various mobile devices and terminal devices to communicate seamlessly. The detailed description set forth below in connection with the appended drawings is intended as a description of the presently preferred embodiments of the messaging systems and methods, and is not intended to represent the only form in which it can be developed or utilized. The description sets forth the features of the messaging system in connection with the illustrated embodiments. It is to be understood, however, that the same or equivalent functions may be accomplished by different embodiments that are also intended to be encompassed with the present disclosure. It is further understood that the use of relational terms such as first, second, and the like are used solely to distinguish one from another entity without necessarily requiring or implying any actual such order or relationship between such entities.

Figure 1:
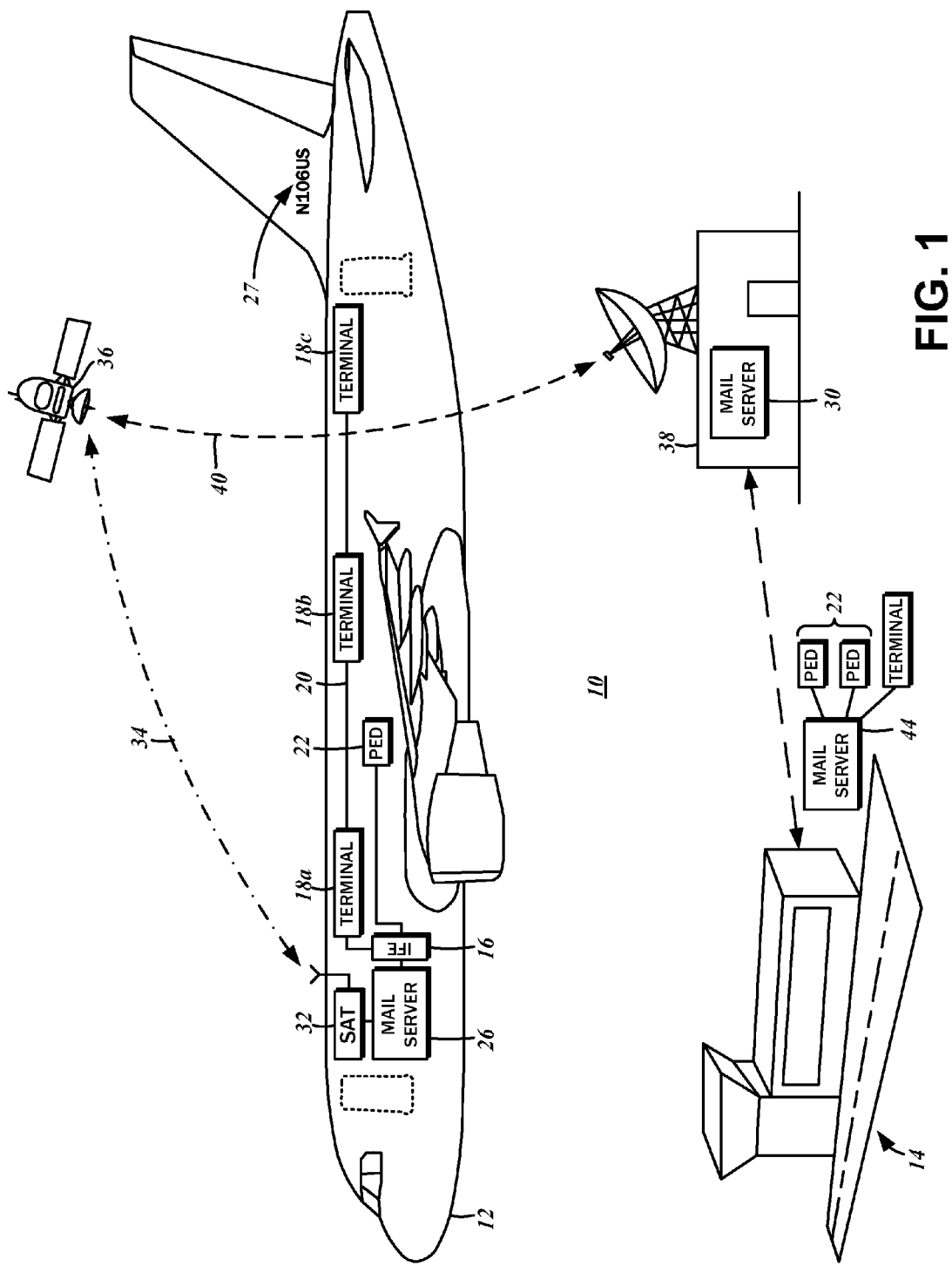
FIG. 1 is a diagram showing an exemplary environment in which various embodiments of a system for exchanging messages among flight and ground crews in accordance with the present disclosure may be utilized.

The diagram of FIG. 1 illustrates an exemplary aviation environment 10 in which various embodiments of the electronic mail-based crew messaging system may be implemented. The figure illustrates a passenger aircraft 12 that flies from one airport 14 to another while carrying passengers and cargo. The present disclosure contemplates a messaging system in which the crew on the aircraft 12, also referred to as the flight crew, can communicate with the crew at the airport 14, also referred to as the ground crew. In addition to the airline personnel at the airport 14, there may be others at operations centers away from the airport 14.

The present disclosure sets forth the various features of the messaging system in a commercial aviation context, though it will be recognized by those having ordinary skill in the art that it may be implemented in other transportation contexts, such as rail (where the train is analogous to the aircraft 12, and the stations are analogous to the airport 14), road, water and so on. In this regard, certain features will be referred to by aviation-specific terms, but these are not intended to be limiting, and other terms that may be more suitable for those alternative contexts may be readily substituted without departing from the present disclosure. However, for the sake of consistency, the aviation-specific terms will be used in describing the following preferred embodiments.

In further detail, the aircraft 12 is equipped with an in-flight entertainment (IFE) system that includes an IFE server 16. Installed at various locations around the cabin of the aircraft 12 are crew terminals 18, including a first terminal 18a, a second terminal 18b, and a third terminal 18c, each of which are connected to the IFE server 16 over a network connection 20. The terminals 18 may include a general-purpose data processor that executes pre-programmed instructions to generate certain outputs in response to certain inputs. Thus, the terminals 18 are understood to include display devices as well as input devices for the crew to input text data and interact with a graphical user interface to various flight/cabin management applications, as well as the contemplated messaging applications that are the subject of the present disclosure.

Figure 2:
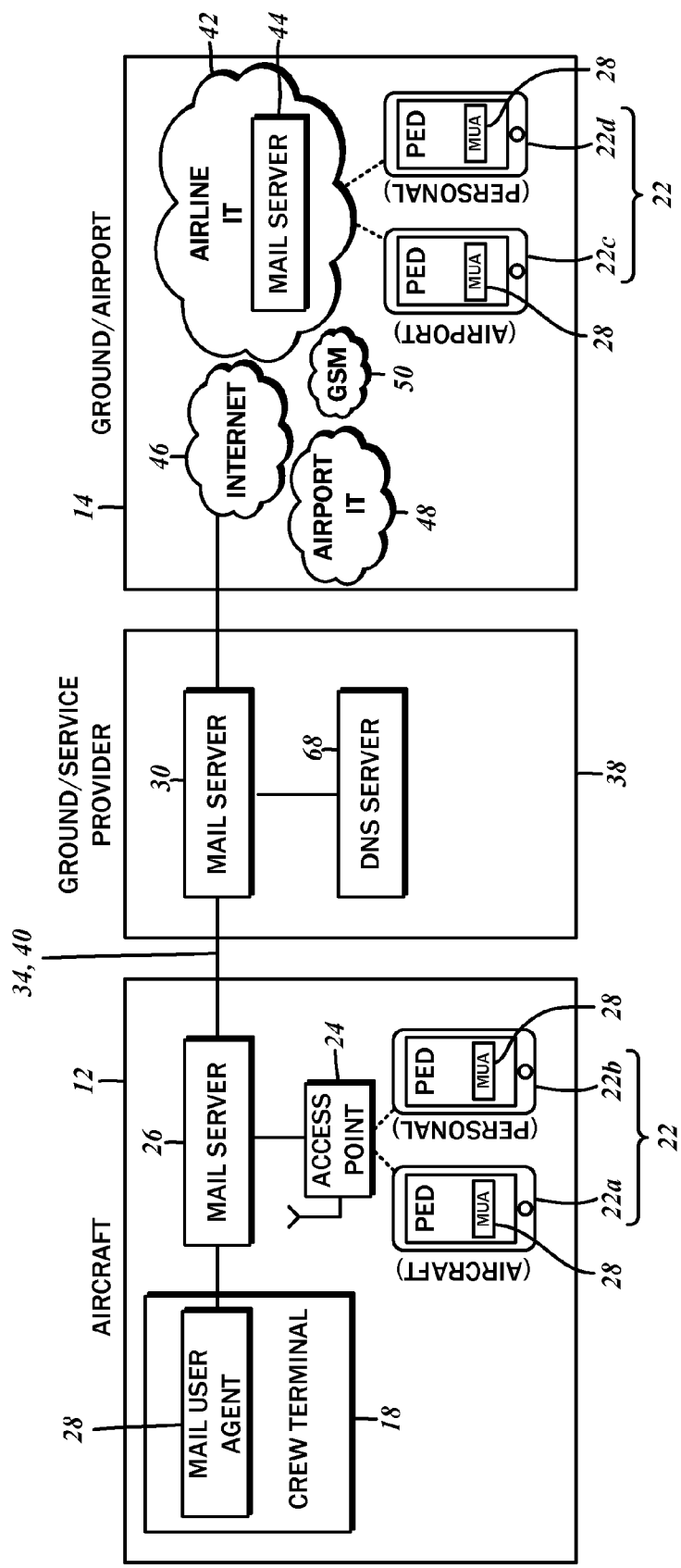
FIG. 2 is a block diagram showing the architecture of the system including its constituent modules/components.

In addition to the stationary terminals 18, flight crew members may be issued personal electronic devices (PEDs) 22 that have the same or similar functionality. The PED 22 may be a conventional mobile communications device such as a smartphone, a tablet, and the like that may be loaded with various software applications and have network connectivity. Via a graphical user interface, the crew member may input text data for a messaging application. Because the PED 22 is portable and intended to be readily available to the crew member regardless of the location within the cabin, it is understood to incorporate wireless data networking capabilities such as WiFi. As best shown in FIG. 2, the aircraft 12 accordingly incorporates a wireless access point 24 to which the PED 22 connects. In the illustrated embodiment, a first PED 22a is assigned to each aircraft 12 and is not moved from one to the other, while a second PED 22b may be assigned to a specific crew member and is thus moved from aircraft to aircraft per the crew member's work schedule.

With continued reference to FIGS. 1 and 2, according to various embodiments of the present disclosure, there is a vehicle mail server computer system, also more specifically referred to as an aircraft mail server 26. The aforementioned terminals 18 and the PEDs 22 are understood to connect to the aircraft mail server 26 to manage the aircraft's electronic mail account. As will be described in further detail below, the aircraft mail server 26 is specific to the aircraft 12, and may be designated by a unique identifier thereof, such as a tail sign or number 27. In alternate embodiments, it may some other unique identification number for the vehicle, such as a VIN (vehicle identification number) or registration number.

The aircraft mail server 26 may be any readily available, off-the-shelf e-mail mail transfer agent (MTA) such as sendmail. Along these lines, the client-side software application loaded on to the terminals 18 and the PEDs 22 can interoperate with such e-mail servers. One possible client application, also referenced in the art as a mail user agent (MUA) 28, is Mozilla Thunderbird™. However, any other suitable e-mail client application may be substituted.

Once the message is accepted by the aircraft mail server 26, it is relayed to the ground. The present disclosure contemplates the use of satellite communications for transfer to a satcom provider mail server 30, and so the aircraft 12 may be equipped with a satellite module 32 that can establish a data uplink 34 to a communications satellite 36. The data uplink 34 may be Ku-band microwave transmissions. Furthermore, any suitable communications satellite 36, such as Inmarsat or Iridium may be utilized.

The data transmitted to the communications satellite 36 is relayed to the satcom service provider 38 that manages the aforementioned satcom provider mail server 30 for that satcom system. A data downlink 40 is established between the communications satellite 36 and the satcom service provider 38. In another embodiment, the aircraft 12 is equipped with a cellular modem instead of or in addition to satellites. Further details regarding the satcom provider mail server 30 and its functionality will be considered more fully below.

The satcom service provider 38 is separate from the airline information technology infrastructure 42 that includes, among other components, an airline mail server 44. Each airline mail server 44 is configured with an account for each airport serviced by that airline. Generally, the airline mail server 44 receives electronic mail messages destined for the aforementioned ground crew members of the airline. The communications link between the satcom service provider 38 and the airline 42 may be over the Internet 46 or private network.

As shown in the block diagram of FIG. 2, PEDs 22 may be provided to the ground crew. In some cases, such as a PED 22c, may be specific to the airport 14, and any number of the ground crew may utilize it during work shifts. Individually assigned PEDs, such as a PED 22d, are also possible. Regardless of how the PED 22 is issued, it is understood to be loaded with a mail user agent client application that is capable of interoperating with the airline mail server 44. Each ground PED 22c or 22d may connect to the airline mail server 44 via WiFi or cellular links. The WiFi link may be provided by airport IT 48 or by airline IT 42. Each ground PED 22c or 22d may be configured with one or more airport mail accounts 74a or 74b.

The arrangement of the multiple mail servers 26, 30, and 44 are presented by way of example only and not of limitation. That is, the segregation of different tasks and duties across these mail servers may be varied, with certain embodiments consolidating the functionality disclosed herein into one or more of the mail servers, while in other embodiments distributing the same functionality over multiple, additional mail servers. Those having ordinary skill in the art will be able to readily ascertain suitable IT infrastructure topologies for maximum efficiency and manageability.

Figure 3:
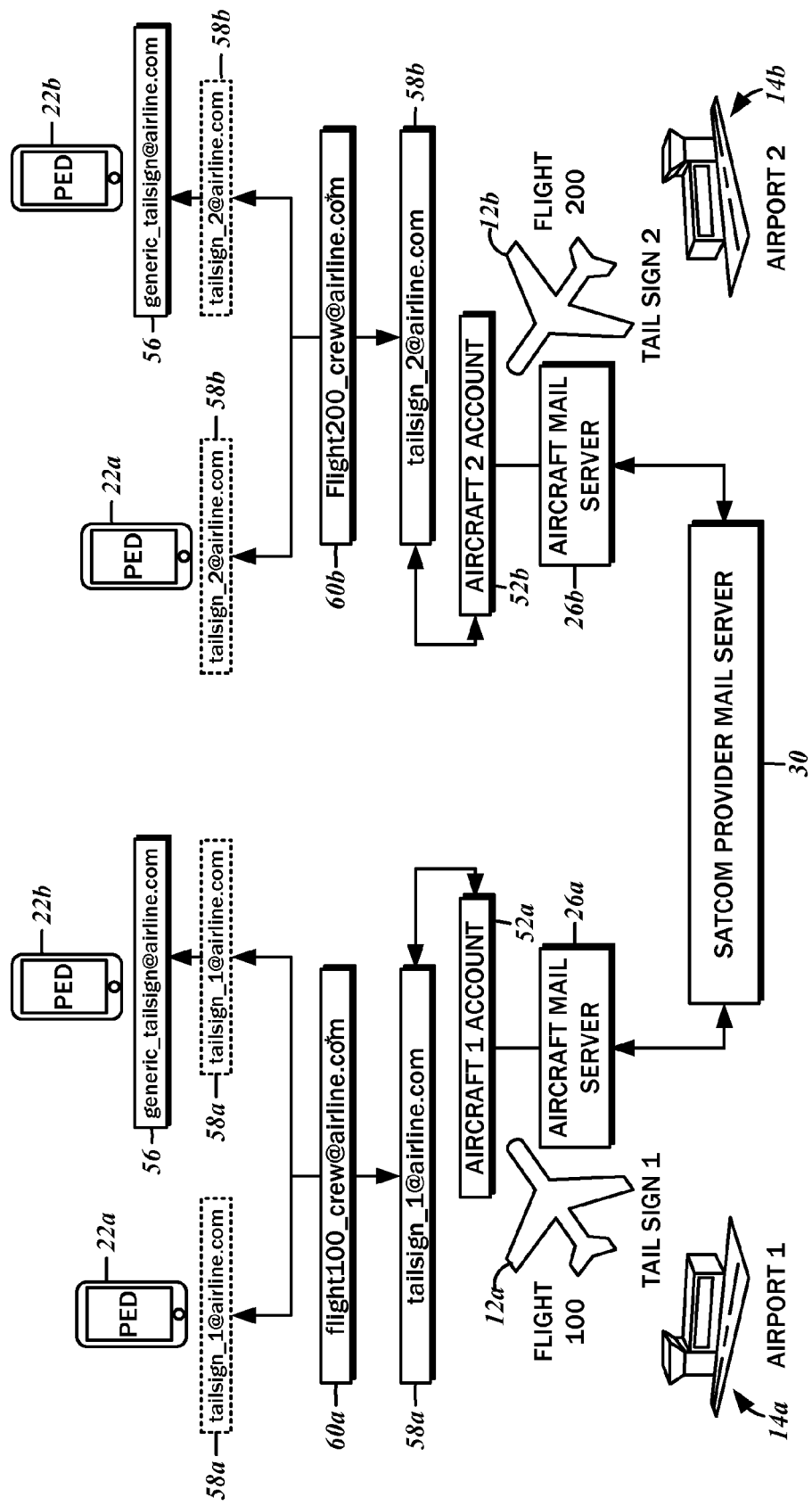
FIG. 3 is a block diagram of the various electronic mail aliases defined for flight crew recipients in accordance with the present disclosure.
Figure 4:
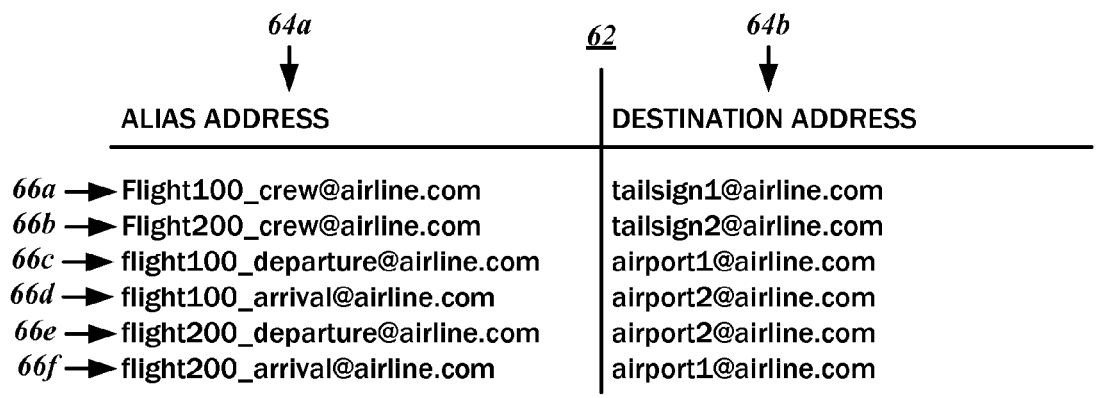
FIG. 4 is a table showing example entries in an alias database that is utilized in the different embodiments of the present disclosure.

The various embodiments of the present disclosure contemplate providing flight crew with a shared e-mail account based on the aircraft identifier (e.g., the tail sign 27), and also providing ground crew with a shared e-mail account based on the airport 14 and the airline. The block diagram of FIGS. 3 and 4 illustrate the messaging architecture, in the context of an example implementation with a first aircraft 12a departing from a first airport 14a destined for a second airport 14b designated as a first flight 100, and a second aircraft 12b departing from the second airport 14b destined for the first airport 14a designated as a second flight 200. Further, the first aircraft 12a is uniquely identified by a tail sign 1, and the second aircraft 12b is uniquely identified by a tail sign 2. It will be recognized that this implementation is presented for exemplary purposes only, and the presently disclosed messaging system is envisioned to be scalable to multiple airports, multiple aircraft, and multiple flights.

As noted above, each aircraft 12 is understood to be equipped with an aircraft mail server 26 in accordance with various embodiments of the present disclosure. The aircraft mail server 26 establishes and maintains a vehicle shared e-mail account 52a that is accessible by the flight crew from the PEDs 22.

The illustrated example includes, in the first flight 100 on board the first aircraft 12a, multiple flight crew members share one or more aircraft PED 22a, and multiple flight crew members each carry a personal PED 22b. The personal PED 22b may also be configured with a personal e-mail address, however the operation of that account is wholly separate from this disclosure and is neither supported nor prohibited by this disclosure. In point of fact, the satcom service provider can whitelist the personal email service provider to allow the personal email account to operate as it would at any terrestrial hotspot. Likewise, in the second flight 200 on board the second aircraft 12b, multiple flight crew members share one or more aircraft PED 22a, and multiple flight crew members each carry a personal PED 22b.

Because the flight crew may rotate among multiple aircraft, the mail user agent 28 in the personal PEDs 22b is not initially configured for accessing only one specific vehicle's shared e-mail account 52a. Nor is the mail user agent 28 in the personal PEDs 22b configured with each vehicle specific shared email account 52 a, since the typically large number of vehicles in the fleet would make the flight crew's selection of the correct email account difficult to manage. Rather each mail user agent 28 in the personal PEDs 22b are assigned a generic shared e-mail account 56 with the address "generic_tailsign@airline.com". The specific shared e-mail account is assigned once the flight crew is onboard the aircraft 12, or come within a certain physical proximity thereto, and a login procedure is completed. The generic shared e-mail account 56 thus inherits the aircraft uniqueness upon login, thus reducing operator workload and operator error. In further detail, this is understood to encompass the PED 22b being assigned the vehicle shared e-mail account 52a that is associated with the particular aircraft 12, in this case the first aircraft 12a, to which it is logged in. A first vehicle e-mail address 58a for the vehicle shared e-mail account 52a includes a unique identifier of the first aircraft 12a, such as the aforementioned tail sign 27. Thus, the first vehicle e-mail address 58a may be, for example, "tailsign_1@airline.com". If the first aircraft 12a has a tail sign 27 of N106US as depicted in FIG. 1, then the first vehicle e-mail address 58a may be "N106US@airline.com".

The second aircraft 12b has a different unique identifier, so it is understood that an e-mail address reflecting this is set in PED 22b.

The procedure for assigning the vehicle shared e-mail account 52 to a generic account is understood to be inapplicable to the aforementioned aircraft-installed terminals 18 and aircraft PEDs 22a, as they are configured persistently from initial set up. In all other respects, however, the terminals 18 and PEDS 22a are understood to be interchangeable with the PEDs 22b. That is, functionality of the PED 22 may be replicated in the terminal 18, even though a specific description thereof has been omitted from the present disclosure for the sake of brevity.

E-mail messages may be sent to the flight crew via the vehicle shared e-mail account 52 on a given aircraft 12 with the vehicle e-mail address 58, that is, the tail sign 27. As will be discussed in further detail below, most mail messages become inapplicable from one flight to the next, regardless of the same aircraft 12 being operated. Various embodiments of the messaging system further envision addressing the flight crew onboard the aircraft 12 by flight number. The satcom provider mail server 30 and/or airline mail server 44 is understood to update and maintain an aliases database that associates flight number/trip identifier-based e-mail addresses to the vehicle e-mail address 58. For example, when the first aircraft 12a is assigned to the flight 100, an alias address 60 (specifically, 60a) therefor may be established, such as "flight100_crew@airline.com". The alias address 60 may also be referred to as a trip identifier alias.

Referring now to the table of FIG. 4, an exemplary alias database 62 that, among other functions, maintains this correspondence between the tail sign and flight assignments is shown. In the implementations utilizing the sendmail MTA, the alias database 62 may be a text file also referred to as /etc/aliases. A first column 64a is understood to specify the incoming or alias address that is specified by the sender, while a second column 64b is understood to specify the destination address to which the message initially directed to the alias address, is re-directed. A first entry 66a indicates an alias address 60a of "flight100_crew@airline.com", and a message directed thereto will be forwarded to a destination address that is the first vehicle e-mail address 58a "tailsign1@airline.com". Along these lines, a second entry 66b specifies an alias address 60b of "flight200@airline.com", which is redirected to a destination address that is the second vehicle e-mail address 58b of "tailsign2@airline.com". The alias database 62, including the tail sign, flight, and airport assignments as contemplated in accordance with the embodiments of the present disclosure may be updated in response to Out of gate, Off the ground, On the ground, and Into the gate (OOOI) statuses as reported from the aircraft 12.

Because in some cases it may be easier to refer to aircraft in terms of flight numbers, in certain embodiments the alias address is set as the primary, and the reply-to field in the messages originating from the aircraft 12 may be set thereto. For example, the reply-to address in messages sent from the first aircraft 12a that is assigned to the first flight 100 may be "flight100_crew@airline.com", while the reply-to address in messages sent from the second aircraft 12b assigned to the second flight 200 may be "flight200_crew@airline.com". While the flight crew could manually configure the mail user agent 28 in the PED 22 or crew terminal 18 to set the reply-to field to be the flight number, more typically the mail server 26 onboard the aircraft 12 would be automatically configured to insert the appropriate flight number alias into the reply—to field of each outgoing email message, as driven by OOOI events thus reducing operator workload and operator error.

Figure 5:
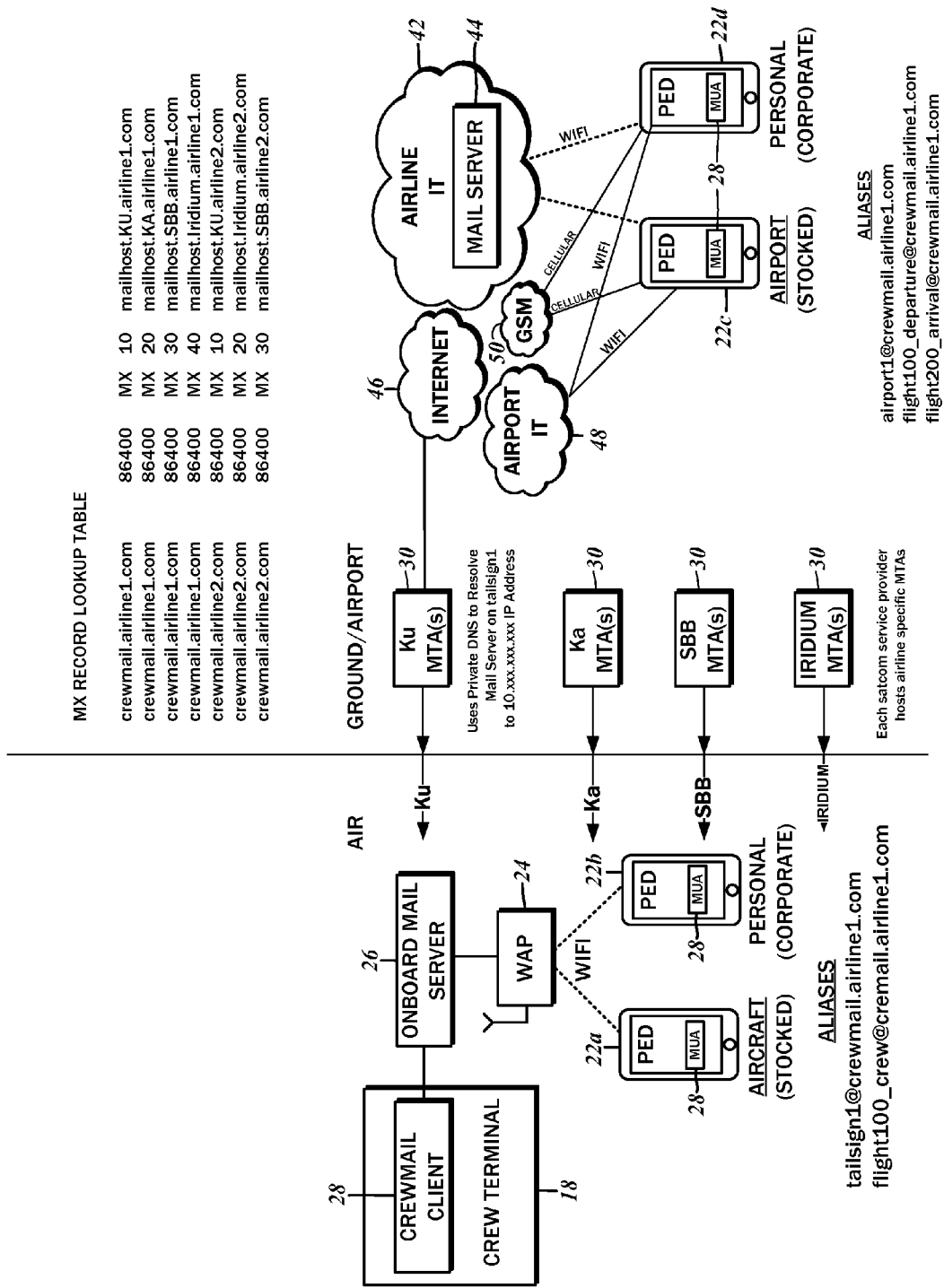
FIG. 5 is a block diagram showing a MX record support for routing across a variety of satcom channels.

With regard to messages transmitted from the mail user agents on the aircraft 12, at least one transmission segment is understood to be the aforementioned satellite data uplink 34 and data downlink 40 to the ground-based service provider 38. Interruptions in connectivity are fairly common and an automated mechanism to reroute via a backup channel is provided by MX records within DNS configuration as shown in FIG. 5. As shown, MX records are domain specific and thus may be tuned according to airline configurations. By way of example, as shown in FIG. 5, airline 1 may have 4 MX entries while airline 2 may have only 3 MX entries, not necessarily in the same order.

To accommodate situations where no channel is available, certain settings of the mail user agent may be modified from typical default values. Once a "send" command is issued to the mail user agent, the message is moved from an outbox to a sent items subfolder after there is a confirmation that the aircraft mail server 26 accepted it. The aircraft mail server 26 may be configured with a short retry window to give the mail user agent a "MESSAGE FAILED DELIVERY" reply during a communications link outage. To the extent the communications link to the communications satellite 36 was not yet established, this quick response may inform the user to make another connection attempt, and resend the message. It would also be preferable not to receive a "MESSAGE FAILED DELIVERY" reply during satellite beam switches, and so the retry duration may be set to greater than ten minutes. Along these lines, the satcom provider mail servers 30 attempting to reach the aircraft mail server 26 may also have retry durations set to greater than ten minutes.

In addition to forwarding mail based on the aforementioned e-mail addresses and aliases, the mail transfer agent running on the satcom provider mail server 30 typically establish data communications links to the aircraft mail servers 26 that host the destination vehicle shared e-mail accounts 52. The aircraft mail servers 26 are therefore identified by an IP (Internet Protocol) address. With reference again to the block diagram of FIG. 2, the correspondence between the specified domain and account identifier, and the particular aircraft mail server 26, may be possible by way of MX record lookups against a DNS server 68. Various forwarding rules may be specified that the aircraft mail server 26 corresponding to the vehicle e-mail address 58 is to be the next mail transfer agent for e-mail messages addressed to the same. Similarly, other forwarding rules may be specified that the satcom provider mail server 30 is to be the next mail transfer agent for e-mail messages that are not directed to accounts hosted on the aircraft mail server 26.

Various embodiments of the present disclosure contemplate also providing ground crew with a shared e-mail account based on the airport 14. Referring now to the block diagram of FIG. 6, at each airport 14, there are ground crew member assigned to one or more airport PEDs 22*c* and one or more ground crew members that each carry a personal PED 22*d*.

Again, the ground crew members with personal PEDs may additionally have a private personal e-mail address that is unique to the individual and the account is not shared with others, however the operation of that account is wholly separate from this disclosure and is neither supported nor prohibited by this disclosure.

Each ground PED 22 is assigned an airport shared e-mail account 72 that is addressed using an airport e-mail address 74. The airport shared e-mail account 72 may be more generally referred to as a first base shared electronic mail account, with the term "base" referring to a starting or stopping point of the vehicle during its journey.

In most cases, ground crew members work at a single airport, so the ground PED 22 may be preset to utilize only the one airport e-mail address 74. To the extent ground crew members may roam to other airports 14, the respective ground PED 22 may also be preset to utilize such a secondary airport e-mail address 74. There is understood to be little complexity in managing such a small number of additional airport shared e-mail accounts 72/airport e-mail addresses 74, and not to the extent of constantly changing flight crew/aircraft assignments that would otherwise benefit from a dynamic address assignment procedure considered above in such context. Thus ground crew members may be expected to select the appropriate airport mail account as needed.

With the airport shared e-mail accounts 72 thus assigned, it is possible to e-mail the entire group of the ground crew at the airport utilizing the airport e-mail address 74. That is, messages may be directed to the ground crew at only the first airport 14*a*, and specifically to the first airport shared e-mail account 72*a*, using the first airport e-mail address 74*a*, "airport1@airline.com". Moreover, messages may be directed to the ground crew at only the second airport 14*b* with the second airport shared e-mail account 72*b*, using the second airport e-mail address 74*b*, "airport2@airline.com".

It may be preferable to address the ground crew based upon the flight number of the aircraft 12 arriving at or departing from the airport 14, rather than by an identifier for the airport 14 itself. The alias database 62 on the satcom provider mail server 30 and/or airline mail server 44 can associate flight number/trip identification and status-based e-mail addresses to the airport e-mail address 74.

Referring back to the table of FIG. 4, with the flight 100 being scheduled to depart from the first airport 14*a* and arrive at the second airport 14*b*, as shown in a third entry 66*c*, a first alias address 76*a* of "flight100_departure@airline.com" may be set for the first airport e-mail address 74*a*, "airport1@airline.com". As shown in the fourth entry 66*d*, a first alias address 78*a* of "flight100_arrival@airline.com" may be set for the second airport e-mail address 74*b*, "airport2@airline.com".

For the flight 200, which is scheduled to depart from the second airport 14*b* and arrive at the first airport 14*a*, a fifth entry 66*e* shows a second alias address 78*b* of "flight200_departure@airline.com" being set for the second airport e-mail address 74*b*, "airport2@airline.com". In a sixth entry 66*f*, a second alias address 76*b* of "flight200_arrival@airline.com" is set for the first airport e-mail address 74*a*, "airport1@airline.com". Because these alias e-mail addresses identify the flight and the status, they may be referred to as a trip identification and status-based e-mail addresses.

Although the trip identification and status-based e-mail addresses can be specified by senders, it is contemplated that mail originating from the ground crew will have a reply-to designation of the airport e-mail address 74. The ground crew do not need to be physically located at the airport 14 to utilize the airport shared e-mail account 72, which may be accessed remotely.

Like the aircraft mail server 26, the satcom provider mail server 30 may also include various forwarding rules. One possible forwarding rule is that the airline mail server 44 is to be the next mail transfer agent for e-mail messages destined for the airport shared e-mail account 72.

The different shared e-mail accounts, including the vehicle shared e-mail accounts 52 and the airport shared e-mail accounts 72, are understood to have a few common characteristics. A message in such a shared e-mail account that has been read by one user will be indicated as being read to all of the other users within the respective mail user agents. In this regard, the messages are understood to have a read status flag that is synchronized across the PEDs 22 and the terminals 18. Other related categorization flags such as color, flagged for attention, or follow-up within certain time periods may also be set on the messages, and viewable by all of the users with access to the shared e-mail account.

It is possible to define subfolders under the main shared e-mail account/Inbox, and one contemplated subfolders is for deleted messages. The view of the Inbox is likewise understood to be synchronized, such that messages moved by one user into the deleted messages subfolder will disappear from view on the other mail user agents, and appear in the respective deleted messages subfolders thereof. As tasks specified in the messages are completed, they could be moved to the deleted messages subfolder. Another contemplated subfolder is for archived messages that pertain to a previous flight. It is understood that the timing of the end of a previous flight and a start of a next flight is managed within the aforementioned alias database 62 based on OOOI data. After each flight, OOOI data may trigger the aircraft mail server 26 to move the remaining messages in the Inbox to a Last Flight subfolder, with those already in the Last Flight subfolder being moved further into a Last Last Flight subfolder, and so on. Eventually, when a predetermined archival time period has elapsed, the messages may be moved to the deleted messages folder. A backup of the contents of the aircraft mail server 26 need not be necessary, as an archive may be maintained on the satcom provider mail server 30.

Figure 6:
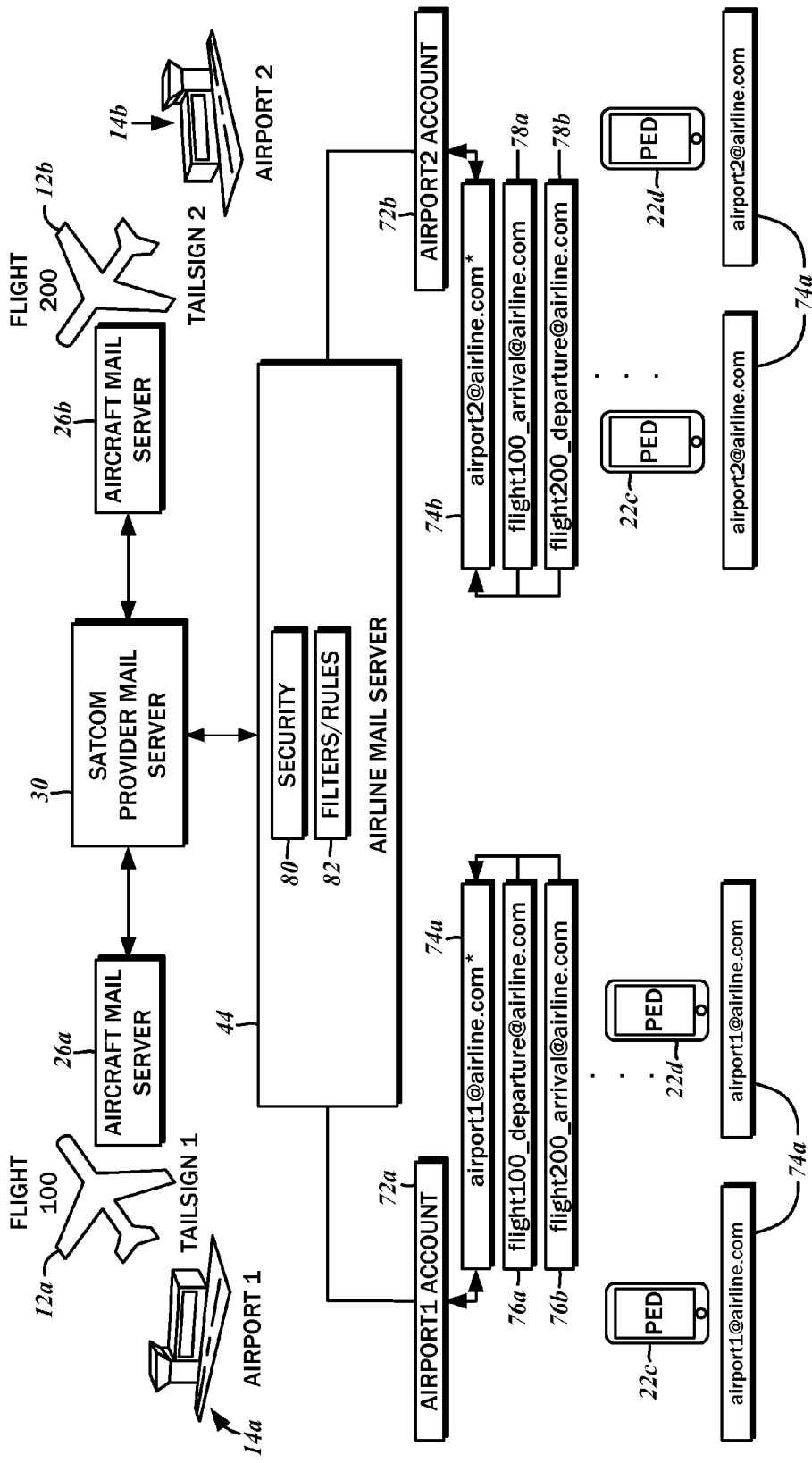
FIG. 6 is block diagram of the various electronic mail aliases defined for ground crew recipients in accordance with the present disclosure.

Referring again to the diagram of FIG. 6, the satcom provider mail server 30 and/or airline mail server 44 are understood to incorporate a security module 80. A person having ordinary skill in the art will recognize that there are several commercial, off-the-shelf security modules 80 that may be utilized.

Unauthorized messages will not be allowed to pass to the aircraft mail servers 26. The satcom provider mail server 30 and/or airline mail server 44 are understood to include a filter/rules module 82 that intercepts incoming messages, examines its addressing information and other data, and either rejects or allows the message to continue on to its destination. One possible filter or rule may be a whitelist of acceptable originating domains. Messages originating from domains not on the whitelist, for example, those from a general consumer level e-mail service like gmail.com, may be rejected.

The filter/rules module 82*m* may also be used to direct messages to certain entities such as airline approved vendors. For example, there may be a blanket rule that directs all messages sent from any aircraft 12 to a particular airport, to a specific vendor. These types of rules may be defined.

The particulars shown herein are by way of example and for purposes of illustrative discussion of the various embodiments of the present disclosure only and are presented in the cause of providing of what is believed to be the most useful and readily understood description of the principles and conceptual aspects thereof. In this regard, no attempt is made to show more details than are necessary for a fundamental understanding of the disclosure, the description taken with the drawings making apparent to those skilled in the art how the several forms of the presently disclosed systems and methods may be embodied in practice.

What is claimed is:

1. A system for exchanging messages between crews stationed on a vehicle and staff or 3rd parties stationed within at least one or more travel points, the system comprising:
    a vehicle mail server computer system deployed on the vehicle, the vehicle mail server computer system including a vehicle shared electronic mail account at least partially addressable by a first email address including a vehicle designator unique to the vehicle and accessible by the crew stationed thereon from vehicle terminal computer devices, the vehicle shared electronic mail account further being at least partially addressable by a second email address including a trip identifier; and
    a central mail server computer system deployed remotely from the vehicle at a fixed location, the central mail server computer system including a first base shared electronic mail account associated with a first one of the at least one or more travel points and at least partially addressable by a third email address including a first base designator corresponding thereto, the first base shared electronic mail account being accessible by the crew deployed to the first one of the at least one or more travel points from base terminal computer devices, the first base shared electronic mail account further being at least partially addressable by a fourth email address including a trip identification and status;
    wherein an association between the second email address and the first email address, and an association between the fourth email address and the third email address, are defined on the central mail server computer system;
    wherein the association between the second email address and the first email address is updated in response to changes in status of the vehicle based on OOOI (Out from gate, Off the ground, On the ground, In to gate) data;
    wherein a flight scheduled to depart from the first one of the at least one or more travel points and arrive at a second one of the at least one or more travel points results in, in addition to the association between the fourth email address and third e-mail address by which the first one of the at least one or more travel points is at least partially addressable, an association defined on the central mail server computer system between another fourth email address and third e-mail address by which the second one of the at least one or more travel points is at least partially addressable, the associations contained within an alias database maintaining a correspondence between the incoming fourth email address that is specified by a sender and the third email address to which the message initially directed to the fourth email address is re-directed.

2. The system of claim 1, wherein at least one of the vehicle terminal computer devices is initially assigned a generic electronic mail account, and subsequently assigned the vehicle shared electronic mail account upon completion of a login procedure to the vehicle mail server computer system, electronic mail messages associated with the vehicle shared electronic mail account being retrievable with the at least one of the vehicle terminal computer devices once the vehicle shared electronic mail account is assigned thereto.

3. The system of claim 1, wherein the fourth email address corresponds to a departure of the vehicle from the first one of the at least one or more travel points.

4. The system of claim 1, wherein the association between the second email address and the first email address, and the association between the fourth email address and the third email address, are updated in response to changes in status of the vehicle as reported therefrom.

5. The system of claim 1, wherein one of the the fourth email address corresponds to an arrival of the vehicle at the first one of the at least one or more travel points.

6. The system of claim 1, wherein an electronic mail message initiated from the vehicle terminal computer device includes a message origin identifier incorporating the second email address.

7. The system of claim 1, wherein an electronic mail message initiated from the base terminal computer device includes a message origin identifier incorporating the third email address.

8. The system of claim 1, wherein:
    electronic mail messages in the vehicle shared electronic mail account each have a read status flag; and
    a read status indicator corresponding to the read status flag is synchronized across the vehicle terminal computer devices.

9. The system of claim 1, wherein:
    the vehicle shared electronic mail account is defined by a primary message storage and a secondary message storage;
    electronic mail messages in the primary message storage are movable to and from the secondary message storage in response to a command input; and
    views of the primary message storage and the secondary message storage being synchronized across the vehicle terminal computer devices.

10. The system of claim 1, wherein the central mail server computer system relays incoming electronic mail messages thereto to the vehicle mail server computer system.

11. The system of claim 10, further comprising:
a rules-based message processor that selectively rejects the incoming electronic mail messages to the central mail server computer system based upon one or more predefined criteria.

12. The system of claim 1, further comprising:
a secure traffic tunnel between the vehicle mail server computer system and the central mail server computer system;
wherein data traffic traversing the secure traffic tunnel is encrypted.

13. A method for transmitting a message to crew members stationed on a vehicle, the method comprising:
receiving the message on a central mail server computer system, the message having a destination email address including a trip identifier;
querying one or more databases for a destination vehicle shared mail account identifier and a network address of a vehicle mail server computer system based upon the destination email address of the received message;
receiving on the central mail server computer system the destination vehicle shared mail account identifier and the network address of the vehicle mail server computer system;
establishing a data communications link to the vehicle mail server computer system with the received network address therefor; and
relaying the message to a destination vehicle mail transfer agent over the data communications link for delivery to a mail account corresponding to the destination vehicle shared mail account identifier;
wherein an association between the destination email address, the destination vehicle shared mail account identifier, and the network address of the vehicle mail server computer system is updated in response to changes in status of the vehicle as reported therefrom based on OOOI (Out from gate, Off the ground, On the ground, In to gate) data;
wherein the association is contained within an alias database maintaining a correspondence between the incoming destination email address that is specified by a sender and the destination vehicle shared mail account identifier and the network address of the vehicle mail server computer system to which the message initially directed to the destination email address is re-directed.

14. The method of claim 13, further comprising:
selectively rejecting the message based upon one or more predefined criteria applied to the message with a rules-based message processor.

15. The method of claim 13, wherein the data communications link to the vehicle mail server computer system is over a secure tunnel, with traffic thereon being encrypted.

16. The method of claim 13, wherein:
the vehicle is an aircraft; and
the data communications link is established over Ku-band satellite transmissions.

17. A method for transmitting a message to crew members stationed at a fixed base travel point, the method comprising:
receiving the message on a central mail server computer system, the message having a destination email address including a trip identification and status;
querying one or more databases for a destination base shared mail account identifier from the destination email address;
associating the message with a mail account corresponding to the destination base shared mail account identifier;
wherein an association between the destination email address and the destination base shared mail account identifier is updated in response to changes in status of a vehicle traversing the fixed base travel point as reported from the vehicle based on OOOI (Out from gate, Off the ground, On the ground, In to gate) data;
wherein a flight scheduled to traverse the fixed base travel point and another fixed base travel point results in, in addition to the association between the destination email address and destination base shared mail account identifier of the fixed base travel point, an association between another destination email address and destination base shared mail account identifier of the another fixed base travel point, the associations contained within an alias database maintaining a correspondence between the incoming destination email address that is specified by a sender and the destination base shared mail account identifier to which the message initially directed to the destination email address is re-directed.

18. The method of claim 17, further comprising:
selectively rejecting the message based upon one or more predefined criteria applied to the message with a rules-based message processor.

19. The method of claim 17, wherein the destination email address corresponds to a departure of the vehicle from the fixed base travel point.

20. The method of claim 17, wherein the destination email address corresponds to an arrival of the vehicle at the fixed base travel point.

* * * * *